(12) United States Patent
Khanka

(10) Patent No.: US 11,523,336 B2
(45) Date of Patent: Dec. 6, 2022

(54) MOBILE COMPUTER DEVICE AND BASE STATION TO SAVE BATTERY LIFE

(71) Applicant: T-Mobile USA, Inc., Bellevue, WA (US)

(72) Inventor: Bhagwan Singh Khanka, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 121 days.

(21) Appl. No.: 16/851,532

(22) Filed: Apr. 17, 2020

(65) Prior Publication Data

US 2021/0329549 A1 Oct. 21, 2021

(51) Int. Cl.
*H04W 52/02* (2009.01)

(52) U.S. Cl.
CPC ... *H04W 52/0216* (2013.01); *H04W 52/0254* (2013.01); *H04W 52/0258* (2013.01)

(58) Field of Classification Search
CPC ......... H04W 52/0216; H04W 52/0254; H04W 52/0258

USPC .......................................................... 370/311
See application file for complete search history.

(56) References Cited

U.S. PATENT DOCUMENTS

| | | | | |
|---|---|---|---|---|
| 10,070,323 | B2* | 9/2018 | Agrawal | H04W 24/02 |
| 2003/0217361 | A1* | 11/2003 | LoMonaco | H04N 7/20 |
| | | | | 725/63 |
| 2004/0176145 | A1* | 9/2004 | Lee | H04W 52/0225 |
| | | | | 455/572 |
| 2011/0053493 | A1* | 3/2011 | Yanagihara | H04W 84/20 |
| | | | | 455/7 |
| 2016/0127473 | A1* | 5/2016 | Khan | H04W 52/0251 |
| | | | | 455/66.1 |
| 2019/0113487 | A1* | 4/2019 | Sugimoto | G01N 30/8631 |
| 2020/0382435 | A1* | 12/2020 | Holm | H04L 67/322 |

* cited by examiner

Primary Examiner — Gbemileke J Onamuti
(74) *Attorney, Agent, or Firm* — Loeb & Loeb LLP

(57) ABSTRACT

The handset and base station disclosed save battery life and processor cycles by further analyzing communication types and patterns to limit communications to times and situations where communications are more likely and where battery preservation will have a significant impact. In one embodiment, the server side controls the timing of communicating voice signals, data signals and control signals to save battery life in a portable computing device.

20 Claims, 5 Drawing Sheets

MOBILE COMPUTER DEVICE AND BASE STATION TO SAVE BATTERY LIFE

BACKGROUND

Battery life of portable computing devices has been an ongoing issue. As computing power and capabilities have increased, so has the demands on processors and the batteries powering the processors. Adding larger batteries increases battery life but adds to the weight and cost and does nothing to reduce processor usage. Other attempts to reduce processor cycles and extend battery life have met with limited success, as extending battery life through additional batteries has become a large industry.

SUMMARY

The handset and base station disclosed save battery life and processor cycles by further analyzing communication types and patterns to limit communications to times and situations where communications are more likely and where battery preservation will have a significant impact. In one embodiment, the server side controls the timing of communicating voice signals, data signals and control signals to save battery life in a portable computing device. The analysis may be driven by a cellular carrier in an attempt to improve the battery life of portable computing devices that use the network thereby addressing the technical problem of battery life in a portable computing device in a new and improved technical way.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

SPECIFICATION

Figure 1:
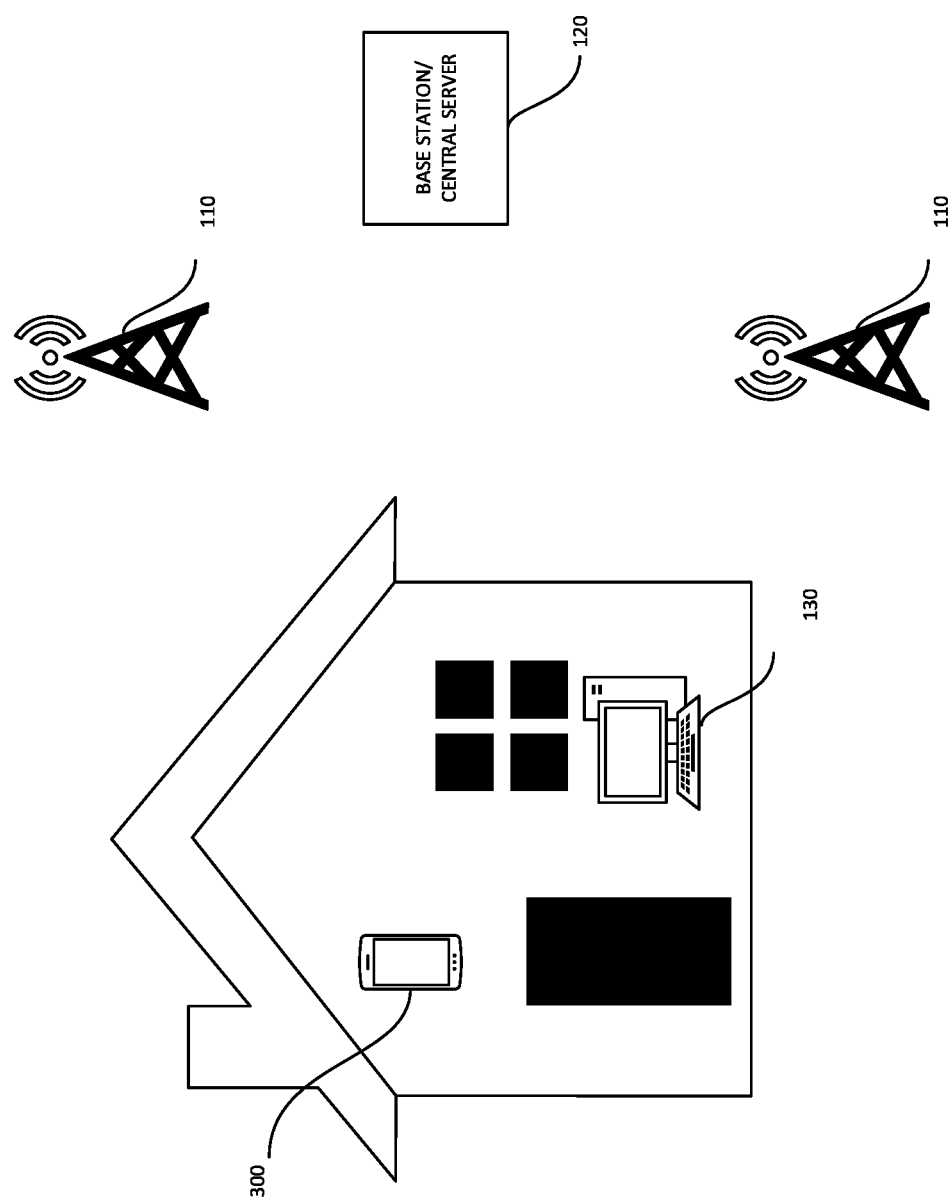
FIG. 1 may be an illustration of a portable computing device being in a house.

Referring to FIG. 1, modern portable computing systems include a portable or mobile computing device 300 with a communication circuit, a processor, a memory and a portable power source. The mobile or portable computing device 300 may include devices such as mobile phones, mobile smart phones, tablets, laptops, hot spots, etc. The mobile computing device 300 may communicate with one or more base stations 110 that may include one or more antennas, a communication circuit, a processor, a memory and a power source. The base station 120 may receive signals from the mobile computing device 300 and communicate the signals to a broader network depending on the communication type. Portable computing devices 300 may communicate voice signals, data signals, control signals, sms signals, etc. In some embodiments, signal types may be converted into packets and communicated as data packets. The data packets may be treated differently depending on the type. For example, dropping a voice packet may be a bigger issue than dropping a data packet, which may be repeated with a minimal performance loss to a user.

Most modern portable computing devices 300 such as cellular phones may have an activity timer. The timer length may be a parameter that may be set by the carrier, by the user or by the phone manufacturer. For example, a user may turn on a phone, and it may ping once, to tell the network it is on and where it is. With the activity timer set at eight hours, unless the phone moves to another cell, makes or receives a call or text or call, or starts a data session, no more communications may happen. After eight hours, the phone 300 may ping again, and then be dormant for eight more hours.

The less the mobile computing device 300 communicates or pings, the longer the battery life the mobile computing device 300 will have. Battery life in mobile devices 300 is a significant technical problem that requires a technical solution. The purpose of the timer is to not use network resources for a phone that has been off for more than a period of time, for example, eight hours. As long as the period of time (eight hours) has not passed, every time an incoming text or voice call comes, the network will "page" the phone, in an attempt to complete the call. If the timer expires, and the phone does not ping again, the network in the form of the cellular towers 110 may not attempt to look for it.

If there is a call and the phone rings two times (again, a timer and paging protocol defined by the carrier. Most carriers "page" twice, before routing to voicemail, about two rings worth), then the calls may proceed to voicemail, it is likely off, but has been off less than eight hours. If the timer is longer than eight hours, the caller may not hear a ring at all as the network may knows it has not "pinged" at the appropriate time, eight hours. Thus, no network resources are wasted looking for it. If a call gets four or five rings before voicemail, the phone is on, but no one is answering. Again, there may be no "standards" for how these timers are set. Each carrier may have internal practices for how they are set.

The only exception may be if a portable phone 300 is on a border between two "location areas," which again are the defined by the carrier according to their preferences. If so, portable phones 300 may periodically rescan and may periodically register, in order to be sure it is on the strongest cell (the rescan time may also be defined by the carrier). If that timer is set at five minutes for example, every five minutes the portable phone 300 may scan a list of towers, sent to it by the network, to see if it is still on the best tower. If on one scan, tower A is strongest, it may register (ping), and the eight hour clock may start. Five minutes later, the phone scans again. If tower A is still the strongest, nothing happens. If for some reason (the phone moved, even slightly) on the next scan Tower B is now strongest, and B is a different location area, it may register again, pinging tower B, and may update its location in the network. Now, if a call comes, the network or base station 120 may know not to look for the phone on tower A, so it will not waste paging resources, it may page on tower B, and any other towers software defined as being part of the same location area. So if a portable phone 300 is between two towers, with nearly equal signal strength, the phone may "ping" every five minutes, or whatever rescan time is set. Note that while the phone is scanning, it may not receive calls, which is why sometimes a call to a phone goes to voicemail, but a call a minute later may ring.

In many cases, portable computing devices 300 control the amount of data that is communicated through the device. Pinging of cellular towers 110 to maintain a registration to enable the receipt of data of all types may ensure data is not missed. However, the central server 120 may also be used to control the data to and from the portable computing device 300. The central server 120 may refrain from communicating voice data when the central server is confident past a threshold that the voice call will not elicit a response such as when a user is sleeping. Similarly, the central server 120 may refrain from communicating data signals when the user is using a second access device, is driving or has a history of not using data during a particular time. The central server 120 may also indicate to the portable computing device to refrain from communicating with the central server until a time passes or circumstances change. In addition, the by using the system and method, the cellular provider may be an active participant in extending the battery life of portable computing devices 300 and portable phones 300 on cellular provider networks using the system and method may have greater battery life than on other cellular systems which is one of many technical improvements.

Figure 3:
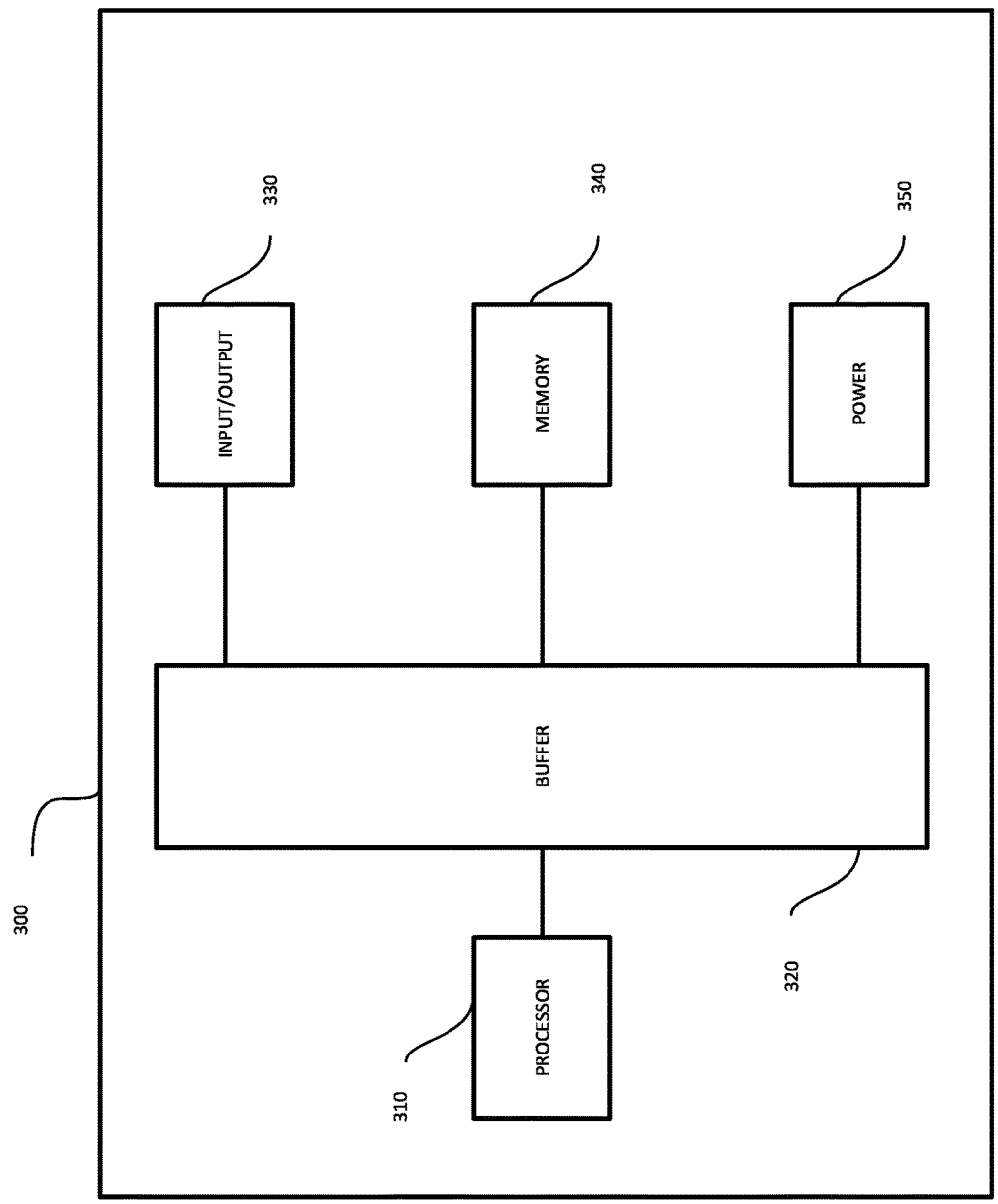
FIG. 3 may be an illustration of the computing elements of a portable computing device.

The mobile computing device 300 may be illustrated in FIG. 3. It may contain a processor 310, a buffer 320, an input/output circuit 330, a memory 340 and a power source 350. The processor 310 may be specifically adapted to operate in a mobile computing environment. For example, the processor 310 may be adapted to turn off sections of the processor not being used to conserve battery life. For example, a video section of the processor 310 may be turn off if the user is just listening to music. Further, the processor 310 may be physically configured according the computer executable instructions. As is known, a processor 310 has logic gates in the form of transistors and the logic gates may be configured according to the computer executable instructions. The configuration of the gates may differ for every logic of each separate set of computer executable instructions.

The memory 340 may be any type of memory. The memory 340 may be adapted to use low power and may have sections that may be set asleep while other sections are accessible. It may be volatile or non-volatile.

The power sources 350 may be a portable power source or a wired power source when wired power is available. A sample power source 350 may be a rechargeable battery or a replaceable portable battery. Solar power may also be augment the power source. The power level may be appropriate for the processor and the memory 340.

The communication circuit 330 may be in communication with the processor 310 and power source 350 and may operate in one or more frequencies appropriate for the service being used. If the service is using WiFi a different frequency may be used than if cellular data is being used. Similarly, 4g cellular data may require a different communication circuit configuration than LTE or 5g. The communication circuit 330 may direct communication traffic to a variety of different communication circuits including WiFi, 3g, 4G, 5G and a variety of different frequencies inside each of the communication circuits.

Figure 2:
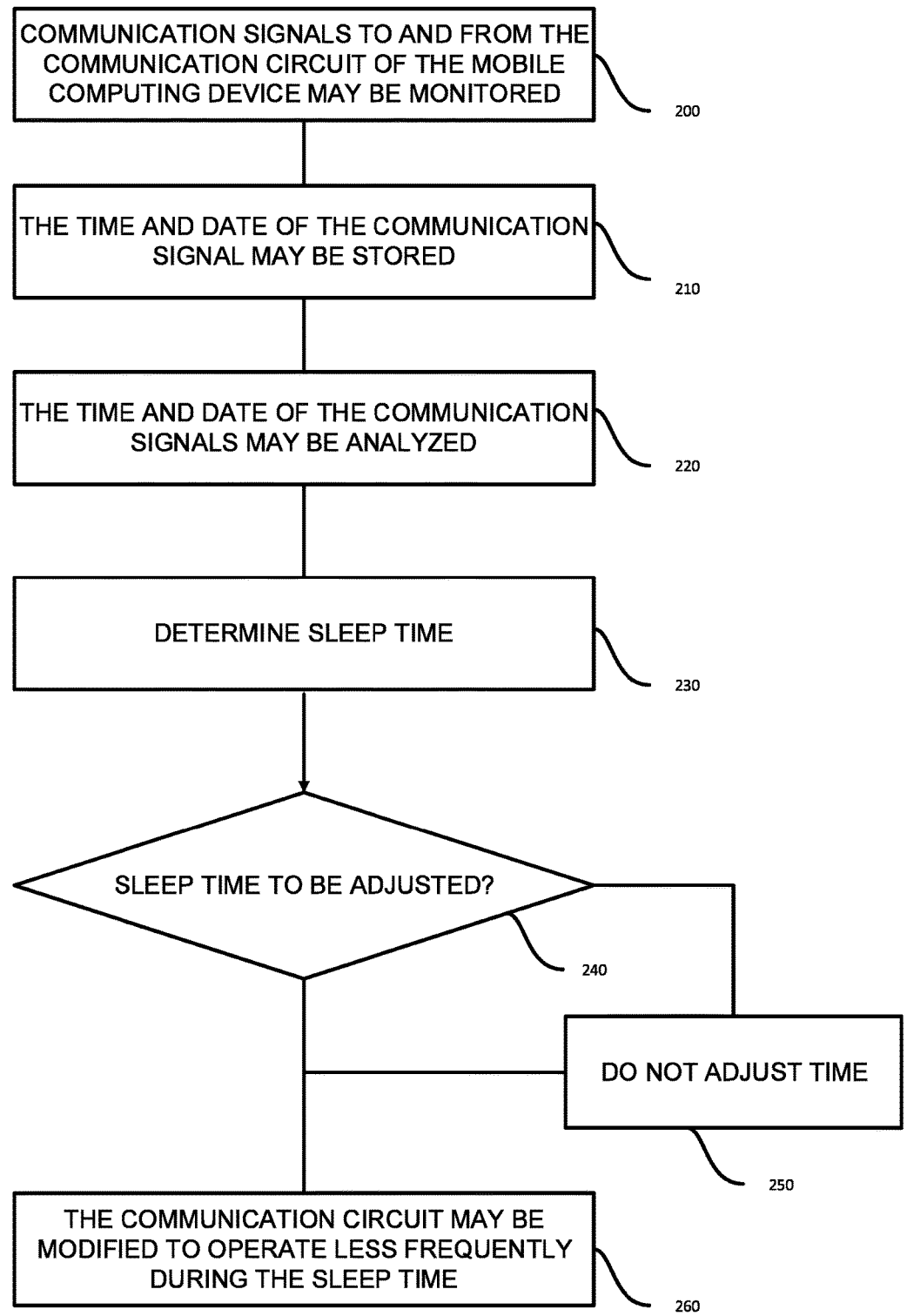
FIG. 2 may be an illustration of a method performed by the processor.

Referring to FIG. 2, at block 200, communication signals to and from the communication circuit of the mobile computing device 300 may be monitored by a central server such as a local cellular antenna, base station, a Wi-Fi antenna or a 5g antenna. The communication signal may include data signals, voice signals, device management signals, or all three signal types. The monitoring may be accomplished on the mobile computing device or may be accomplished at the central server receiving device or at a central server in communication with the receiving device. The purpose of the monitoring may be used determine when a communication has been made and to determine when another communication should be made.

At block 210, the time and date of the communication signal may be stored. Again, the storage may be on the mobile computing device or may be accomplished at the receiving device or at a central server in communication with the receiving device. The time and date of the communication may be stored such that the time since the most recent communication may be determined and it may be used to determine when the next communication may be made.

The storage may be specific to the type of communication. For example, data signals may continue at a periodic rate as emails arrive, for example, while phone data may be more infrequent as day becomes night and people go to sleep. The storage may separate the signals into the different types to speed analysis later.

At block 220, the time and date of the communication signals may be analyzed. The analysis may make several determinations. The analysis may review past communication types, times and dates to determine future communication types, times and dates. For example, the analysis may review past communication types, times and dates to determine future communication types, times and dates. Thus, if a user takes a nap every day from 2 pm to 3 pm, the analysis may determine that the data signals and voice signals should be turned off or put to sleep between 2 pm and 3 pm every day. The determination may be based on an algorithm, may be based on learning from past experiences or may be made from feedback from an authority.

In one embodiment, machine learning may be used to review and analyzed past communication times and types to determine future communications time and types. In some embodiments, communication time thresholds may be refined over time. A communication time threshold may be a time in which the system and method are confident above a threshold that the portable computing device may need to receive a communication. The threshold may be set by a user, may be set by a carrier or may be set by learning from past experiences.

Figure 4:
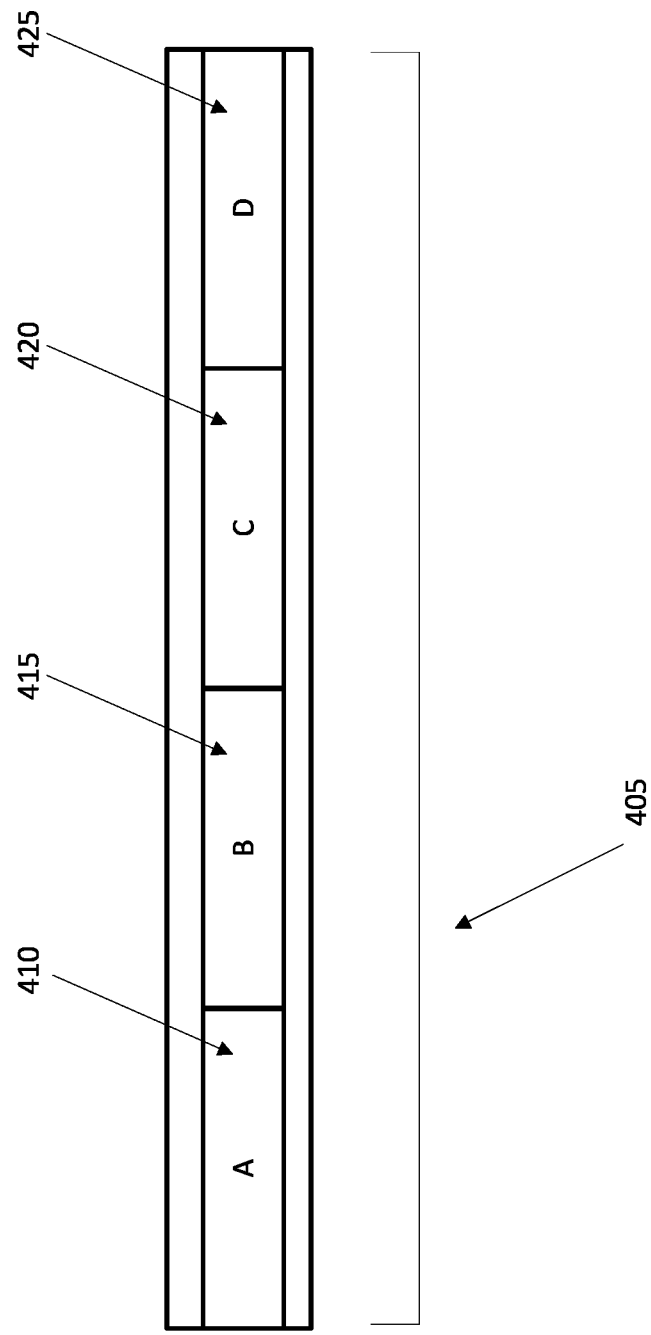
FIG. 4 may be an illustration of data set used to train a machine learning algorithm.
Figure 5A:
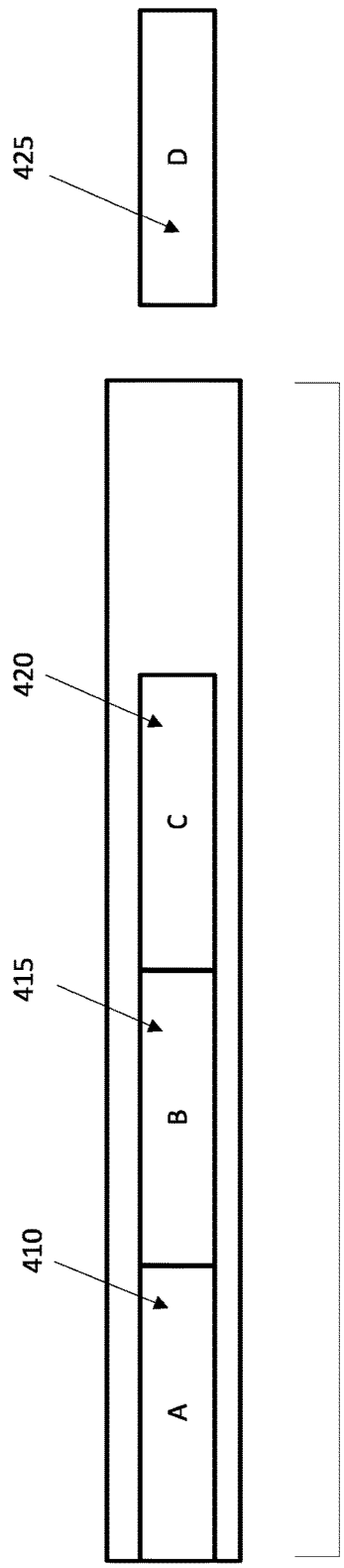
FIGS. 5a and 5b may be illustrations of rotating data sets through a machine learning algorithm.
Figure 5B:
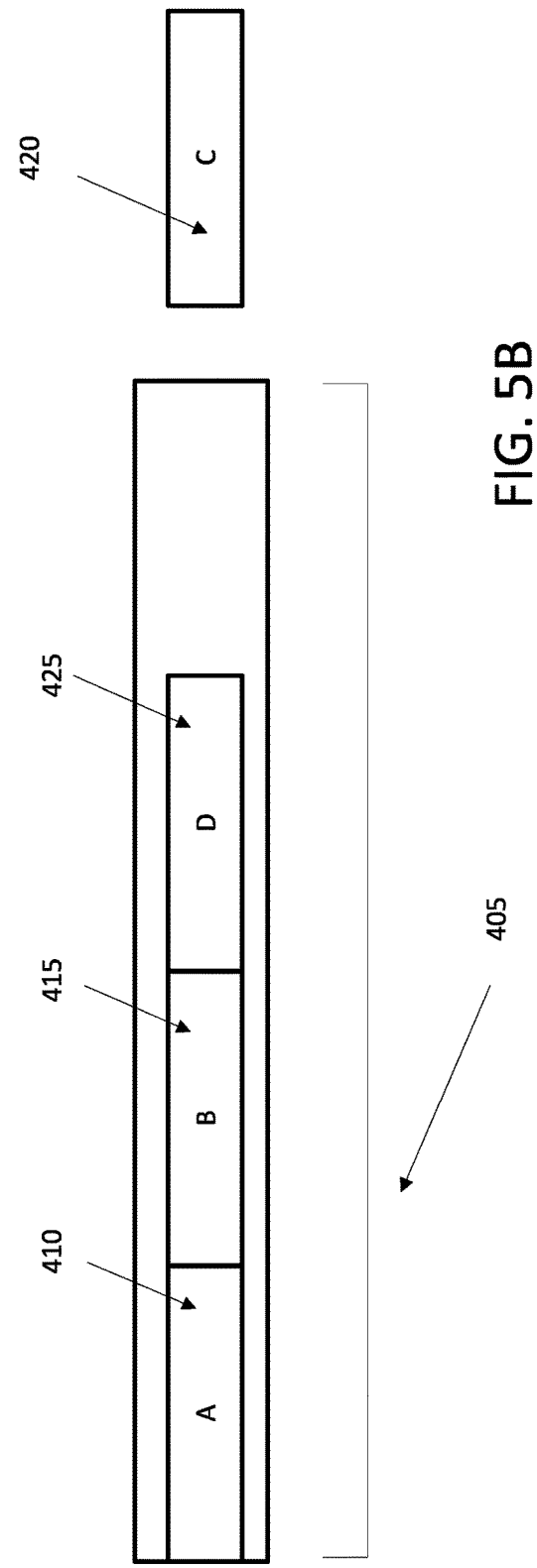

Machine learning may be used to analyze past thresholds in view of the actual results, so that the detection of a sleep time becomes more accurate. Machine learning may be used to review a training group of past thresholds and determine improved thresholds moving forward. FIG. 4 may illustrate sample artificial intelligence (AI) training data according to one or more embodiments. As an example and not a limitation, an artificial intelligence system may trained by analyzing a set of training data 405. The training data may be broken into sets, such as set A 410, set B 415, set C 420 and set D 425. As illustrated in FIG. 5A, one set may be used as a testing data set (e.g., set D 425) and the remaining sets may be used as a training data set (e.g., set A 410, set B 415 and set C 420). The artificial intelligence system may analyze the training data set (e.g., set A 410, set B 415 and set C 420) and use the testing set (e.g., set D 425) to test the model created from the training data. The data sets may shift as illustrated in FIG. 5B, where the testing data set may be added to the training data sets (e.g., set A 410, set B 415 and set D 425) and one of the training data sets that has not been used to test before (e.g., set C 420) may be used as the testing data set. The analysis of the new training data (e.g., set A 410, set B 415 and set D 425) may occur again with the new testing set (e.g., set C 420) being used to test the model and the model may be refined. The rotation of data sets may occur repeatedly until all the datasets have been used as the test data set. The model then may be considered complete and the model may then be used on additional data sets.

The analysis may be different for voice signals than for data signals. A user may intentionally turn off the voice features of a portable computing device at night. The analysis may indicate that the voice sections of a mobile computing device may be turned off while at night. Similarly, if a user is using an additional comping device to receive data signals, the data signal features on the portable computing device may be disabled to save battery power. Logically, the analysis may attempt to determine any times the various aspects of the mobile computing device may be put to sleep without effecting the expectations of a user.

At block 230, a sleep time may be determined. The sleep time may indicate times and dates when communication signals should be less frequent or stop altogether. The sleep time may be determined by determining times and dates when voice communication signals or data signals should be less frequent. As mentioned previously, the sleep time may vary for data and voice signals. Thus, a voice sleep time may be determined where the voice sleep time includes times and dates when voice communication signals should be less frequent. Similarly, a data sleep time may be determined where the data sleep time includes times and dates when data communication signals should be less frequent.

At block 240, it may be determined whether the sleep time needs to be adjusted. Over time, the sleep time and timing may change for data signals and for voice signals. For example, a person may change jobs and the daily routine may change as some offices may be more open to employees using their phone at work than other employers. Similarly, the days of work or time of work may change which may change the sleep time.

If it is determined at block 240 that the sleep time does not have to be adjusted, at block 250, the sleep time may not be adjusted. For example, if a user follows the same pattern of daily life, there may be no need to change the sleep time.

If it is determined at block 240 that the sleep time does have to be adjusted, at block 260, the communication circuit 330 may be modified to operate less frequently during the sleep time. In some embodiments, the timer may be adjusted to change the time until the next communication. As an example, the mobile computing device 300 may be in communication with an additional power source that may make conserving the battery a lesser concern and the sleep time may be turned off while the portable computing device is using an additional power source.

The sleep timer may be used by the portable computing device 300 and the base station 120. If the analysis is performed on the portable computing device 300, the sleep time may be communicated from the portable computing device 300 to the base station 120. Similarly, if the base station 120 performs the analysis to determine the sleep time, the base station 120 may communicate the sleep time to the portable computing device 300.

In another aspect, the method may determine if the responsible party of the portable computing device 300 is using an additional computing device 130 (FIG. 1). The idea may be that if the user is receiving data signals on a desktop 130, there may be no need to use the battery life to communicate data signals to the portable computing device 300. The determination may be made in several ways. In one embodiment, a user may log in to one or more web sites using a first computing device 300. The webs sites may determine that the mobile computing device user is also logged in to an additional device 120 such as a desktop device in which case it may make sense to not communicate to the portable computing device 300 until the desktop device 120 disconnects. Other ways of confirming that a user is online using a separate device 120 may include analyzing MAC addresses, analyzing IP addresses or a combination of logins, MAC addresses and IP addresses.

In yet another aspect, the sleep time may be disabled if the mobile computing device 300 is determined to be in motion in a vehicle. In some situation, a mobile computing device 300 may be used as navigation and data signals may be needed. In other situations, the portable computing device 300 may be stored away to avoid being a distraction. If the portable computing device 300 is stored away, communication may halted. In some embodiments, such as when the portable computing device 300 is connected to a car audio system via Bluetooth or the like, the communication may continue and the sleep may be paused.

In one embodiment, machine learning may be used to detect the sleep time. In some embodiments, sleep time thresholds may be refined over time. A sleep threshold may be a time in which the system and method are confident above a threshold that the portable computing device will not need to receive a communication. The threshold may be set by a user, may be set by a carrier or may be set by learning from past experiences.

Machine learning may be used to analyze past thresholds in view of the actual results, so that the detection of a sleep time becomes more accurate. Machine learning may be used to review a training group of past thresholds and determine improved thresholds moving forward. FIG. 4 may illustrate sample artificial intelligence (AI) training data according to one or more embodiments. As an example and not a limitation, an artificial intelligence system may trained by analyzing a set of training data 405. The training data may be broken into sets, such as set A 410, set B 415, set C 420 and set D 425. As illustrated in FIG. 5A, one set may be used as a testing data set (e.g., set D 425) and the remaining sets may be used as a training data set (e.g., set A 410, set B 415 and set C 420). The artificial intelligence system may analyze the training data set (e.g., set A 410, set B 415 and set C 420) and use the testing set (e.g., set D 425) to test the model created from the training data. The data sets may shift as illustrated in FIG. 5B, where the testing data set may be added to the training data sets (e.g., set A 410, set B 415 and set D 425) and one of the training data sets that has not been used to test before (e.g., set C 420) may be used as the testing data set. The analysis of the new training data (e.g., set A 410, set B 415 and set D 425) may occur again with the new testing set (e.g., set C 420) being used to test the model and the model may be refined. The rotation of data sets may occur repeatedly until all the datasets have been used as the test data set. The model then may be considered complete and the model may then be used on additional data sets.

In many cases, portable computing devices 300 control the amount of data that is communicated through the device. Pinging of cellular towers 110 to maintain a registration to enable the receipt of data of all type may ensure data is not missed. However, the central server 120 controlled by a carrier may also be used to control the data to and from the portable computing device 300. The central server 120 may refrain from communicating voice data when the central server 120 is confident past a threshold that the voice call will not elicit a response such as when a user is sleeping. Similarly, the central server 120 may refrain from communicating data signals when the user is using a second access device 130, is driving or has a history of not using data during a particular time. By using the system and method, the cellular provider may be an active participant in extending the battery life of portable computing devices 300 and phones 300 on cellular provider networks using the system and method may have greater battery life than on other cellular systems.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The electronic devices, computing devices, sensors, computers, routers, and/or servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The electronic devices, computers, sensors, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A mobile computing device comprising:
   a processor;
   a memory;
   a power source;
   a communication circuit;
   wherein the processor is physically configured according to computer executable instructions for:
      monitoring communication signals to and from the communication circuit of the mobile computing device;
      storing the time and date of the communication signal;
      analyzing the time and date of the communication signals;
      determining a sleep time wherein the sleep time comprises times and dates when communication signals should be less frequent;
      modifying the communication circuit to operate less frequently during the sleep time;
      determining if a second computing device is being used by a user of the mobile computing device; and
      in response to a determination that the user of the mobile computing device is using the second computing device, disabling the sleep time.

2. The mobile computing device of claim 1, wherein communication signal comprise data signals and voice signals.

3. The mobile computing device of claim 2, further comprising analyzing voice signals and analyzing data signals.

4. The mobile computing device of claim 3, further comprising determining a voice sleep time wherein the voice sleep time comprises times and dates when voice communication signals should be less frequent.

5. The mobile computing device of claim 3, further comprising determining a data sleep time wherein the data sleep time comprises times and dates when data communication signals should be less frequent.

6. The mobile computing device of claim 1, wherein the analysis reviews past communication types, times and dates to determine future communication types, times and dates.

7. The mobile computing device of claim 1, further comprising determining if the portable computing device is in communication with an additional power source.

8. The mobile computing device of claim 7, further comprising disabling the sleep time if the mobile computing device is determined to be in communication with the additional power source.

9. The mobile computing device of claim 1, further comprising disabling the sleep time if the mobile computing device is determined to be in motion in a vehicle.

10. The mobile computing device of claim 1, wherein determining if a second computing device is being used by the user of the mobile computing device comprises:
    analyzing one or more of websites the user is logged in to on the mobile computing device and/or the second computing device, media application control (MAC) addresses associated with the mobile computing device and/or the second computing device, and Internet Protocol (IP) addresses associated with the mobile computing device and/or the second computing device.

11. A mobile communication device control server comprising:
    a processor;
    a memory;
    a power source;
    a communication circuit;
    wherein the processor is physically configured according to computer executable instructions for:
       monitoring communication signals to and from the communication circuit of the mobile computing device;
       storing the time and date of the communication signal;
       analyzing the time and date of the communication signals;
       determining a sleep time wherein the sleep time comprises times and dates when communication signals should be less frequent;
       modifying the communication circuit to operate less frequently during the sleep time;
       determining if a second computing device is being used by a user of the mobile computing device; and
       in response to a determination that the user of the mobile computing device is using the second computing device, disabling the sleep time.

12. The mobile communication device control server of claim 11, wherein communication signal comprise data signals and voice signals.

13. The mobile communication device control server of claim 12, further comprising analyzing voice signals and analyzing data signals.

14. The mobile communication device control server of claim 13, further comprising determining a voice sleep time wherein the voice sleep time comprises times and dates when voice communication signals should be less frequent.

15. The mobile communication device control server of claim 13, further comprising determining a data sleep time wherein the data sleep time comprises times and dates when data communication signals should be less frequent.

16. The mobile communication device control server of claim 11, wherein the analysis reviews past communication types, times and dates to determine future communication types, times and dates.

17. The mobile communication device control server of claim 11, further comprising determining if the portable computing device is in communication with an additional power source.

18. The mobile communication device control server of claim 17, further comprising disabling the sleep time if the mobile computing device is determined to be in communication with the additional power source.

19. The mobile communication device control server of claim 11, further comprising disabling the sleep time if the mobile computing device is determined to be in motion in a vehicle.

20. The mobile communication device control server of claim 11, wherein determining if a second computing device is being used by the user of the mobile computing device comprises:

analyzing one or more of websites the user is logged in to on the mobile computing device and/or the second computing device, media application control (MAC) addresses associated with the mobile computing device and/or the second computing device, and Internet Protocol (IP) addresses associated with the mobile computing device and/or the second computing device.

\* \* \* \* \*